(12) United States Patent
Hong

(10) Patent No.: US 8,719,418 B2
(45) Date of Patent: May 6, 2014

(54) PERSONAL COMPUTER SYSTEM FOR MOBILE TERMINAL USER AND OPERATION METHOD THEREOF

(76) Inventor: Woon Sig Hong, Yongin-si (KR)

( * ) Notice: Subject to any disclaimer, the term of this patent is extended or adjusted under 35 U.S.C. 154(b) by 0 days.

(21) Appl. No.: 13/817,619

(22) PCT Filed: Aug. 17, 2011

(86) PCT No.: PCT/KR2011/006023
§ 371 (c)(1),
(2), (4) Date: Feb. 19, 2013

(87) PCT Pub. No.: WO2012/023790
PCT Pub. Date: Feb. 23, 2012

(65) Prior Publication Data
US 2013/0159534 A1 Jun. 20, 2013

(30) Foreign Application Priority Data
Aug. 17, 2010 (KR) .......... 10-2010-0079156

(51) Int. Cl.
G06F 15/173 (2006.01)
G06F 15/167 (2006.01)

(52) U.S. Cl.
USPC .......................... 709/226; 709/216

(58) Field of Classification Search
None
See application file for complete search history.

(56) References Cited

U.S. PATENT DOCUMENTS

| | | | |
|---|---|---|---|
| 6,601,101 B1* | 7/2003 | Lee et al. ............ | 709/227 |
| 6,678,715 B1* | 1/2004 | Ando ................ | 718/105 |
| 6,826,613 B1* | 11/2004 | Wang et al. ......... | 709/227 |
| 8,489,798 B2* | 7/2013 | Miyasaka .......... | 710/316 |
| 2004/0022020 A1* | 2/2004 | Leem ................ | 361/683 |
| 2006/0095501 A1* | 5/2006 | Mochida ............ | 709/203 |
| 2008/0034092 A1* | 2/2008 | Kikuchi et al. ...... | 709/225 |

FOREIGN PATENT DOCUMENTS

| | | |
|---|---|---|
| JP | 10-091586 | 4/1998 |
| KR | 10-2002-0083862 | 11/2002 |
| KR | 10-0846322 | 7/2008 |
| WO | WO 02-29591 | 4/2002 |

OTHER PUBLICATIONS

International Search Report for PCT/KR2011/006023, mailed Feb. 28, 2012.

* cited by examiner

Primary Examiner — John B. Walsh
(74) Attorney, Agent, or Firm — Stein IP, LLC

(57) ABSTRACT

A personal computer system for a mobile terminal user and an operation method thereof are provided. The personal computer system includes multiple main boards on which at least one software is run, multiple storage devices that are each configured to store at least one software to be used by a mobile terminal user allocated to the storage device, and a relay board system configured to select one main board in standby mode from among the multiple main boards and connect the selected main board to one storage device that is allocated to a mobile terminal user among the multiple storage devices in response to an access request from the mobile terminal user to run software, and to disconnect the selected main board from the allocated storage device in response to a request for termination of use of the selected main board from the mobile terminal user.

18 Claims, 3 Drawing Sheets

PERSONAL COMPUTER SYSTEM FOR MOBILE TERMINAL USER AND OPERATION METHOD THEREOF

CROSS-REFERENCE TO RELATED APPLICATIONS

This application is the §371 national stage of International Application No. PCT/KR2011/006023, filed Aug. 17, 2011, which claims the benefit of Korean Application No. 10-2010-0079156, filed Aug. 17, 2010 in the Korean Intellectual Property Office. The disclosures of both applications are incorporated herein by reference.

TECHNICAL FIELD

The following description relates to a personal computer system for a mobile terminal user and an operation method thereof, and more particularly, to a technology for systemizing personal computers which are less in number than mobile terminals in an effort to process a program that cannot be run by a mobile terminal due to lack of system resources on the mobile terminal.

BACKGROUND ART

The improvement of performance of mobile devices and the development of network intra-structure lead to an explosive increase of the use of mobile devices in processing task. mobile terminals such as smart phones and tablet-type computers are designed to be compact for the portability, and have no difficulties in running programs suitable to Internet web-browsing and mobile terminals, but yet have less system resources than traditional personal computers. Hence, when a task requiring computing power of personal computer level needs to be executed during working with a mobile device, a user of the mobile device may proceed with executing the task on the personal computer, or may use a remote desktop program of WINDOWS or a remote access program such as a virtual network computing (VNC) viewer such that the mobile device can remotely access the personal computer having a relevant program installed thereon and execute the task in remote.

In a working environment where most tasks are processed by a mobile device and a task that must be processed by a personal computer is processed only by the personal computer due to lack of system resources on the mobile device, a mobile device's user is required to have both the mobile device and the personal computer that is rather expensive. However, the personal computer is far less frequently used compared to the mobile device, and thus the purchase of both the personal computer and the mobile device may be a waste of cost and resource. Nevertheless, it is a dilemmatic circumstance as the personal computer is required to process a specific task that has to be executed by the personal computer.

Meanwhile, cloud computing services have been increasingly used. The cloud computing services store personal operating systems (OSes) or software in a server and allow individuals to access the server through their terminal and to run the stored OS or software. However, the cloud computing services may incur high cost servers and complexity in server management, may waste energy because large-capacity servers need to be in operation at all times regardless of access of users, and may not be as flexible as the personal computer in terms of OS or software upgrading.

Furthermore, if users use servers of a cloud computing service provider, security problems such as illegal exposure or leakage of critical personal data which is stored in a common storage device of a remote server may occur.

DISCLOSURE OF INVENTION

Technical Problem

The following description relates to a personal computer system and an operation method thereof. The personal computer system systemizes personal computers which are less in number than mobile terminals in an effort to process a program that cannot be run by a mobile terminal due to lack of system resources on the mobile terminal.

Solution to Problem

In one general aspect, there is provided a personal computer system including: multiple main boards on which at least one software is run; multiple storage devices each configured to store at least one software to be used by a mobile terminal user allocated to the storage device; and a relay board system configured to select one main board in standby mode from among the multiple main boards and connect the selected main board to one storage device that is allocated to a mobile terminal user among the multiple storage devices in response to an access request from the mobile terminal user to run software, and to disconnect the selected main board to the storage device allocated to the mobile terminal user in response to a request for termination of use of the selected main board from the mobile terminal user. The number of the multiple main boards is smaller than the number of the multiple storage devices.

The relay board system may include a control unit configured to verify access authority according to the access request from the mobile terminal user to run software, and, if the access authority is verified valid, select one main board in standby mode from among the multiple main boards, generate a switch-on signal to connect the selected main board to the storage device allocated to the mobile terminal user, and generate a switch-off signal according to the request for termination of use of the selected main board and a switching unit configured to switch according to the switch-on signal to connect the selected main board to the storage device allocated to the mobile terminal user and to switch according to the switch-off signal to disconnect the selected main board to the storage device allocated to the mobile terminal user.

The control unit may be further configured to transmit address information of the selected main board to the mobile terminal when the access authority is verified valid.

The control unit may be further configured to turn on the selected main board when the selected main board is connected to the storage device allocated to the mobile terminal user, and to turn off the selected main board when the selected main board is disconnected to the storage device allocated to the mobile terminal user.

The relay board system may be configured to be connected to each of the multiple main boards and the multiple storage devices through serial ATA (SATA)-type power and data cables.

The multiple main boards may have the same hardware specifications.

In another general aspect, there is provided an operation method of a personal computer system, including: receiving, at a relay board system, an access request from a mobile terminal user to run software; in response to the received access request, selecting, at the relay board system, one main board in standby mode from among multiple main boards and connecting the selected main board to a storage device that is allocated to the mobile terminal user among multiple storage devices; and in response to a request for termination of use of the selected main board from the mobile terminal user, disconnecting, at the relay board system, the selected main board to the allocated storage device.

The selecting of one main board to connect the selected main board to the storage device may include verifying, at the relay board system, access authority of the mobile terminal user to run software, selecting, at the relay board system, the main board in standby mode and connecting the selected main board to the storage device allocated to the mobile terminal user among the multiple storage devices when the access authority is verified valid, and turning on, at the relay board system, the selected main board when the selected main board is connected to storage device allocated to the mobile terminal user.

The selecting of the main board in standby mode to connect the selected main board to the storage device allocated to the mobile terminal user may include transmitting, at the relay board system, address information of the selected main board to the mobile terminal, and thereby allowing the mobile terminal to access to the selected main board.

The disconnecting of the selected main board to the allocated storage device may further include turning off, at the relay board system, the selected main board after disconnecting the selected main board to the allocated storage device.

Advantageous Effects of Invention

According to a personal computer system for a mobile terminal user and an operation method thereof in accordance with embodiments of the present invention, in a working environment where mobile terminals are used to execute a task, programs that cannot be run by a mobile terminal due to lack of system resources on the mobile terminal are processed by systemizing personal computers which are less in number than the mobile terminals. Accordingly, in the working environment in which the mobile terminals are used as primary working tools, additional personal computers can be maintained at the minimum number, and consequently investment cost and maintenance cost are reduced. In addition, electrical energy can be saved compared with a case in which all mobile terminal users individually use their own personal computers or use servers for cloud computing services.

Figure 1:
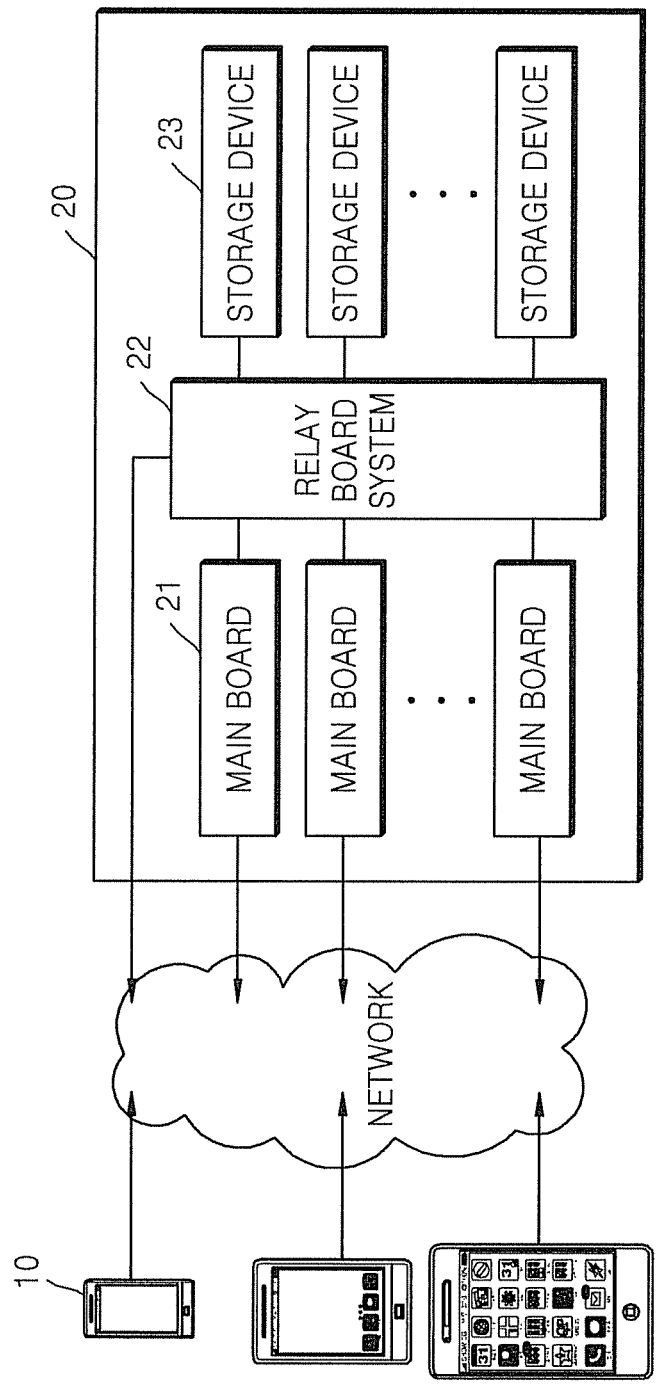
FIG. 1 is a diagram illustrating an example of a configuration of a personal computer system for a mobile terminal user.

Throughout the drawings and the detailed description, unless otherwise described, the same drawing reference numerals will be understood to refer to the same elements, features, and structures. The relative size and depiction of these elements may be exaggerated for clarity, illustration, and convenience.

BEST MODE FOR CARRYING OUT THE INVENTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a configuration of a personal computer system for a mobile terminal user.

As shown in the example illustrated in FIG. 1, the personal computer system 20 may include multiple main boards 21, multiple storage devices 23, and a relay board system 22. The multiple main boards 21 may run at least one software. In this case, the multiple main boards 21 may have the same hardware specifications. That is, each main board 21 may be configured with the same type of hardware components such as central processing unit (CPU), random access memory (RAM), and the like. This is because the same hardware specifications among the multiple main boards 21 may not affect booting up or running a program on one of the multiple main boards 21 even when the multiple main boards 21 have different operating systems (OSes) and different programs installed thereon.

Each of the multiple storage devices 23 may store at least one piece of software to be used by users of mobile terminals 10 allocated to the storage device 23. The number of main boards 21 may be smaller than the number of the storage devices 23. The number of the main boards 21 may be calculated based on the number of mobile terminal users having the storage devices 23 allocated thereto and a rate of concurrent access and use. The rate of concurrent access and use may refer to a ratio between the number of the mobile terminal users having the storage devices 23 allocated thereto and the number of users who can concurrently access the personal computer system 20 among the mobile terminal users having the storage devices 23 allocated thereto. The number of users who can concurrently access the personal computer system 20 may be obtained from data accumulated by investigating the number of mobile terminal users that access the personal computer system 20 for a predefined period of time. For example, if there are 10 mobile terminal users having the storage devices 23 allocated thereto and 10 mobile terminal users can access the personal computer system 20 among the 10 mobile terminal users having the storage devices 23 allocated thereto, the rate of concurrent access and use is 50%(= (5/10)*100).

As described above, the main boards 21 which are less in number than the storage devices 23 may reduce system configuration cost. In other words, by configuring the personal computer system 23 with less number of main boards 21 that are relatively more expensive compared to the storage devices 23, the system configuration cost can be reduced.

In response to an access request from a user of a given mobile terminal 10 to run software, the relay board system 22 may select one main board in standby mode from among the multiple main boards 23 and connect the selected main board to the storage device that is allocated to the mobile terminal user. Thereafter, in response to a request from the mobile terminal user to terminate the use of the selected main board, the relay board system 22 may disconnect the storage device 23 allocated to the mobile terminal user to the selected main board 21.

Figure 2:
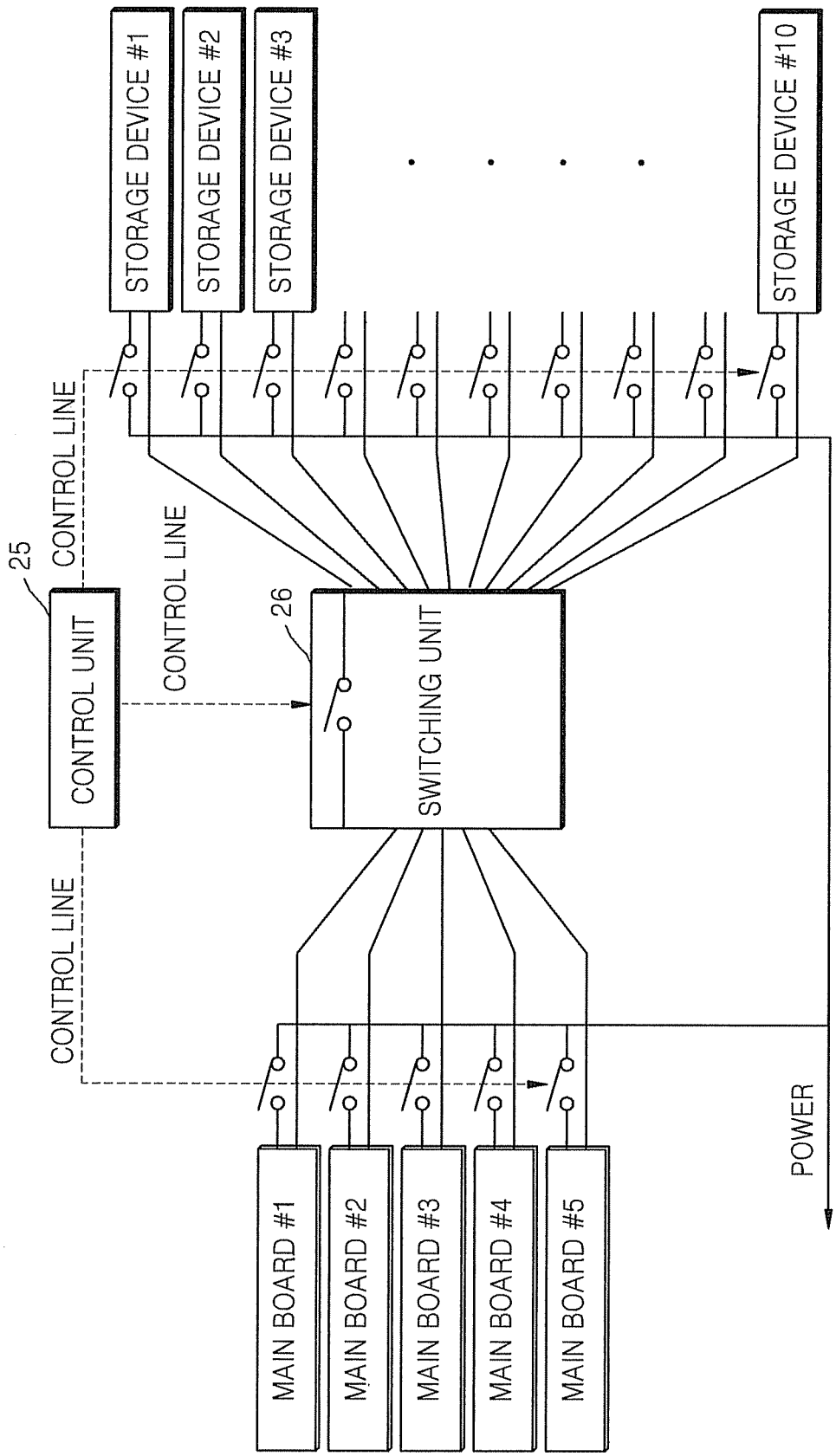
FIG. 2 is a diagram illustrating an example of a relay board system.

The relay board system 22 may include a control unit 25 and a switching unit 26 as shown in FIG. 2, and the control unit 25 and the switching unit 26 may be connected to each of the multiple main boards and the multiple storage units using serial ATA (SATA)-type power and data cables.

In response to an access request from a given mobile terminal user to run software, the control unit 25 may verify access authority. When the mobile terminal user is verified valid, the control unit 25 may select one main board in standby mode, generate a switch-on signal for connecting the selected main board to the storage device allocated to the mobile terminal user, and provide the generated switch-on signal to the switching unit 26. In addition, in response to a request for terminating the use of the selected main board, the control unit 25 may generate a switch-off signal and provide the signal to the switching unit 26.

Figure 3:
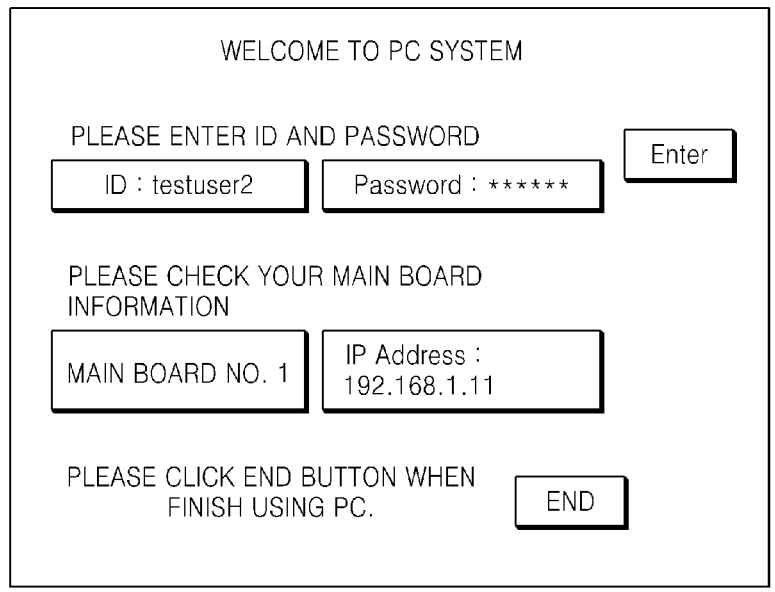
FIG. 3 is an illustration showing an example of a webpage provided by the relay board system shown in FIG. 2.

When the access authority is verified valid, the control unit 25 may transmit address information of the selected main board to the mobile terminal. That is, in response to access of the mobile terminal to the personal computer system, the control unit 25 may provide a webpage as shown in an example illustrated in FIG. 3 to verify access authority based on identifier (ID) and passwords input to the provided webpage. If the access authority is verified valid, the control unit 25 may transmit the address information of the selected main board to the mobile terminal. The address information of the main board to be transmitted to the mobile terminal may be an Internet protocol (IP) address. By use of the received address information, the mobile terminal is enabled to access the selected main board. The control unit 25 may display information of the selected main board and the address information of the main board on the webpage as shown in FIG. 3. Moreover, in response to an 'end' button being clicked in the webpage as shown in FIG. 3, the control unit 25 may determine that the mobile terminal user requests to terminate the use of the selected main board, and hence generate a switch-off signal and provide the signal to the switching unit 26.

Furthermore, the control unit 25 may turn on the selected main board when the selected main board is connected to the storage device allocated to a given mobile terminal user, and may turn off the selected main board when the main board is disconnected to the storage device allocated to the mobile terminal user.

The switching unit 26 may switch to connect the selected main board to the storage device allocated to the mobile terminal user according to the switch-on signal provided from the control unit 25, and may switch to disconnect the selected main board to the storage device allocated to the mobile terminal user according to the switch-off signal.

Figure 4:
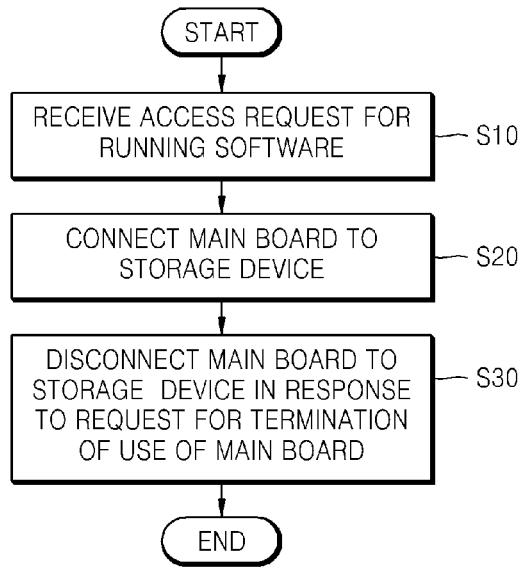
FIG. 4 is a flowchart illustrating an example of an operation method of a personal computer system.

FIG. 4 illustrates a flowchart of an example of an operation method of a personal computer system.

Referring to FIG. 4, a relay board system receives an access request from a given mobile terminal user to run software (S10).

In response to the received access request, the relay board system selects one main board in standby mode from among multiple main boards and connects the selected main board to a storage device which is allocated to the mobile terminal user among multiple storage devices (S20). The relay board system may verify access authority according to the access request from the mobile terminal user. The relay board system may select one main board in standby mode when the access authority is verified valid, and may connect the selected main board to the storage device which is allocated to the mobile terminal user among the multiple storage devices. The relay board system may turn on the selected main board when the selected main board is connected to the storage device allocated to the mobile terminal user. In addition, the relay board system may transmit address information of the selected main board to the mobile terminal, thereby allowing the mobile terminal to access the selected main board and run desired software.

The relay board system disconnects the selected main board to the allocated storage device in response to a request from the mobile terminal user to terminate the use of the selected main board (S30). In this case, the relay board system may turn off the selected main board after disconnecting the selected main board to the allocated storage device. Accordingly, the selected main board returns to standby mode to be used by other mobile terminal users.

As described above, according to the personal computer system for a mobile terminal user and an operation method thereof, in a working environment where mobile terminals are used to execute a task, programs that cannot be run by a mobile terminal due to lack of system resources on the mobile terminal are processed by systemizing personal computers which are less in number than the mobile terminals. Accordingly, in the working environment in which the mobile terminals are used as primary working tools, additional personal computers can be maintained at the minimum number, and consequently investment cost and maintenance cost are reduced. In addition, electrical energy can be saved compared with a case in which all mobile terminal users individually use their own personal computers or use servers for cloud computing services.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

INDUSTRIAL APPLICABILITY

This invention can be used in the field of using computer system.

The invention claimed is:
1. A personal computer system comprising:
multiple main boards on which at least one software is run;
multiple storage devices, which are as many as mobile terminal users, each of the multiple storage devices being allocated to a respective mobile terminal user, each of the multiple storage devices being configured to store at least one software and one operating system to be used by the mobile terminal user allocated thereto; and
a relay board system configured to select one main board in standby mode from among the multiple main boards, connect the selected main board to one storage device that is allocated to a mobile terminal user among the multiple storage devices in response to an access request from the mobile terminal user to run software, run the software, and to disconnect the selected main board to the storage device allocated to the mobile terminal user in response to a request for termination of use of the selected main board from the mobile terminal user, wherein the relay board system is capable of selecting any main board out of the multiple main boards and connecting the selected main board to any storage device out of the multiple storage devices, wherein the number of the multiple main boards is smaller than the number of the multiple storage devices, thereby minimizing the number of the multiple main boards for the mobile terminal users.

2. The personal computer system of claim 1, wherein the relay board system comprises
a control unit configured to verify access authority according to the access request from the mobile terminal user to run software, and, if the access authority is verified valid, select one main board in standby mode from among the multiple main boards, generate a switch-on signal to connect the selected main board to the storage device allocated to the mobile terminal user, and generate a switch-off signal according to the request for termination of use of the selected main board and
a switching unit configured to switch according to the switch-on signal to connect the selected main board to the storage device allocated to the mobile terminal user and to switch according to the switch-off signal to disconnect the selected main board to the storage device allocated to the mobile terminal user.

3. The personal computer system of claim 2, wherein the control unit is further configured to transmit address information of the selected main board to the mobile terminal when the access authority is verified valid.

4. The personal computer system of claim 2, wherein the control unit is further configured to turn on the selected main board when the selected main board is connected to the storage device allocated to the mobile terminal user, and to turn off the selected main board when the selected main board is disconnected to the storage device allocated to the mobile terminal user.

5. The personal computer system of claim 4, wherein the relay board system is configured to be connected to each of the multiple main boards and the multiple storage devices through serial ATA (SATA)-type power and data cables.

6. The personal computer system of claim 4, wherein the multiple main boards have the same hardware specifications.

7. The personal computer system of claim 1, wherein the multiple main boards have the same hardware specifications.

8. The personal computer system of claim 1, wherein the relay board system is configured to be connected to each of the multiple main boards and the multiple storage devices through serial ATA (SATA)-type power and data cables.

9. An operation method of a personal computer system, comprising:
receiving, at a relay board system, an access request from a mobile terminal user to run software;
in response to the received access request, selecting, at the relay board system, one main board in standby mode from among multiple main boards, connecting the selected main board to a storage device that is allocated to the mobile terminal user among multiple storage devices, and running the software; and
in response to a request for termination of use of the selected main board from the mobile terminal user, disconnecting, at the relay board system, the selected main board to the allocated storage device,
wherein the multiple storage devices, which are as many as the mobile terminal users, each of the multiple storage devices being allocated to a respective mobile terminal user, each of the multiple storage devices being configured to store at least one software and one operating system to be used by the mobile terminal user allocated thereto,
wherein the relay board system is capable of selecting any main board out of the multiple main boards and connecting the selected main board to any storage device out of the multiple storage devices,
wherein the number of the multiple main boards is smaller than the number of the multiple storage devices, thereby minimizing the number of the multiple main boards for the mobile terminal users.

10. The operation method of claim 9, wherein the selecting of one main board to connect the selected main board to the storage device comprises
verifying, at the relay board system, access authority of the mobile terminal user to run software,
selecting, at the relay board system, the main board in standby mode and connecting the selected main board to the storage device allocated to the mobile terminal user among the multiple storage devices when the access authority is verified valid, and
turning on, at the relay board system, the selected main board when the selected main board is connected to storage device allocated to the mobile terminal user.

11. The operation method of claim 10, wherein the selecting of the main board in standby mode to connect the selected main board to the storage device allocated to the mobile terminal user comprises transmitting, at the relay board system, address information of the selected main board to the mobile terminal, and thereby allowing the mobile terminal to access to the selected main board.

12. The operation method of claim 10, wherein the relay board system is connected to each of the multiple main boards and the multiple storage devices through serial ATA (SATA)-type power and data cables.

13. The operation method of claim 10, wherein the multiple main boards have the same hardware specifications.

14. The operation method of claim 9, wherein the disconnecting of the selected main board to the allocated storage device further comprises turning off, at the relay board system, the selected main board after disconnecting the selected main board to the allocated storage device.

15. The operation method of claim 14, wherein the relay board system is connected to each of the multiple main boards and the multiple storage devices through serial ATA (SATA)-type power and data cables.

16. The operation method of claim 14, wherein the multiple main boards have the same hardware specifications.

17. The operation method of claim 9, wherein the relay board system is connected to each of the multiple main boards and the multiple storage devices through serial ATA (SATA)-type power and data cables.

18. The operation method of claim 9, wherein the multiple main boards have the same hardware specifications.

* * * * *